(12) United States Patent
Blackburn

(10) Patent No.: US 6,256,925 B1
(45) Date of Patent: Jul. 10, 2001

(54) STORAGE DEVICE FOR FISH LURES, NAMELY, SPINNERBAITS

(76) Inventor: Edwin L. Blackburn, 814 Blackburn St., Grand Prairie, TX (US) 75050

( * ) Notice: Subject to any disclaimer, the term of this patent is extended or adjusted under 35 U.S.C. 154(b) by 0 days.

(21) Appl. No.: 09/270,307

(22) Filed: Mar. 15, 1999

Related U.S. Application Data

(60) Provisional application No. 60/078,756, filed on Mar. 15, 1998.

(51) Int. Cl.$^7$ .................................................. A01K 97/06
(52) U.S. Cl. ............................................................ 43/57.1
(58) Field of Search ................................... 43/57.1, 57.2, 43/4.5; 206/315.11

(56) References Cited

U.S. PATENT DOCUMENTS

| | | | | |
|---|---|---|---|---|
| 2,220,817 | * | 11/1940 | Holmes | 43/57.1 |
| 2,316,833 | * | 4/1943 | Baron | 43/57.1 |
| 2,580,913 | * | 1/1952 | Hawthorne | 43/57.1 |
| 2,711,050 | * | 6/1955 | McIntyre | 43/57.1 |
| 2,801,492 | * | 8/1957 | Karwyk | 43/57.1 |
| 3,182,872 | * | 5/1965 | Brosseau | 43/57.1 |
| 3,350,810 | * | 11/1967 | Warner | 43/57.1 |
| 3,512,295 | * | 5/1970 | La Barge | 43/57.1 |
| 3,758,977 | * | 9/1973 | Miller | 43/57.1 |
| 3,797,161 | * | 3/1974 | Smallwood | 43/57.1 |
| 3,858,345 | * | 1/1975 | Ziegler | 43/57.1 |
| 3,948,579 | * | 4/1976 | Schirmer | 312/111 |
| 4,245,422 | * | 1/1981 | Souza | 43/57.1 |
| 4,958,730 | * | 9/1990 | Bunten | 43/57.1 |
| 5,079,863 | * | 1/1992 | Gillespie | 43/54.1 |

* cited by examiner

Primary Examiner—Kurt Rowan
(74) Attorney, Agent, or Firm—Charles W. McHugh

(57) ABSTRACT

A major feature of the invention is an open-top receptacle for receiving and holding the blade of a spinnerbait. The preferred receptacle has a pair of rigid, confronting and spaced-apart walls that are designated (for identification purposes) as first and second walls. The spacing between the first and second walls is made less than the width of a spinnerbait blade, in order that a vertically oriented blade within a receptacle cannot rotate about a vertical axis within the receptacle. Additionally, the first wall has a small notch that is sized and located to receive and restrain one leg of the spring wire against movement in a side-to-side direction with respect to the receptacle.

Another major part of the invention may be broadly described as a means for holding a given spinnerbait against accidental removal from the particular receptacle in which it is being stored. The holding is accomplished by manually placing the spring wire in tension by temporarily forcing the distal ends of the two legs together in order that the included angle between the two legs is appreciably less than the original 80 degrees. There is also a structure for restraining the legs and holding them against their natural tendency to return to a rest condition, i.e., to spread the legs back to the position they had before they were slightly distended during insertion. The preferred structure includes a small plate that is inclined away from and affixed to the first wall, and the plate having a generally L-shaped recess into which a leg of the spinnerbait is inserted when the spinnerbait is to be stored. The structural plate and an appropriately shaped and sized recess do their holding in a completely passive manner, in the sense that they have no moving parts or springs, etc. Instead of using moving parts, holding of a spinnerbait is accomplished in this invention by relying—at least primarily—on the resilience that is inherent in the wire of a spinnerbait.

4 Claims, 2 Drawing Sheets

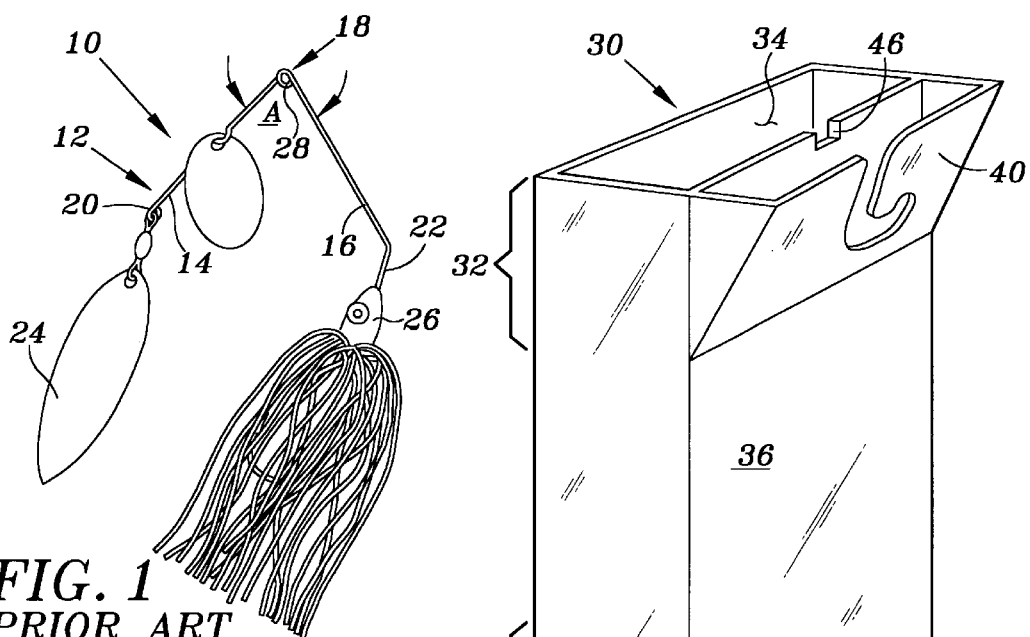
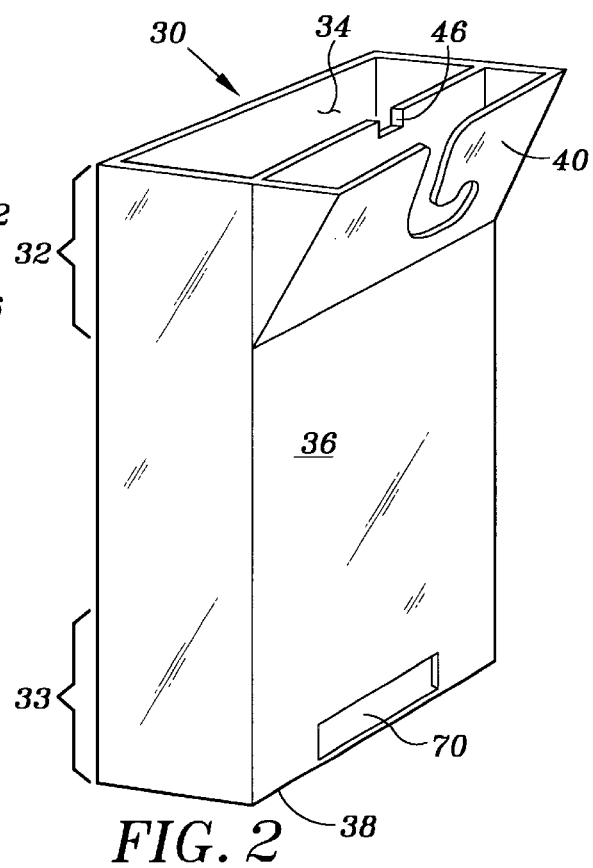
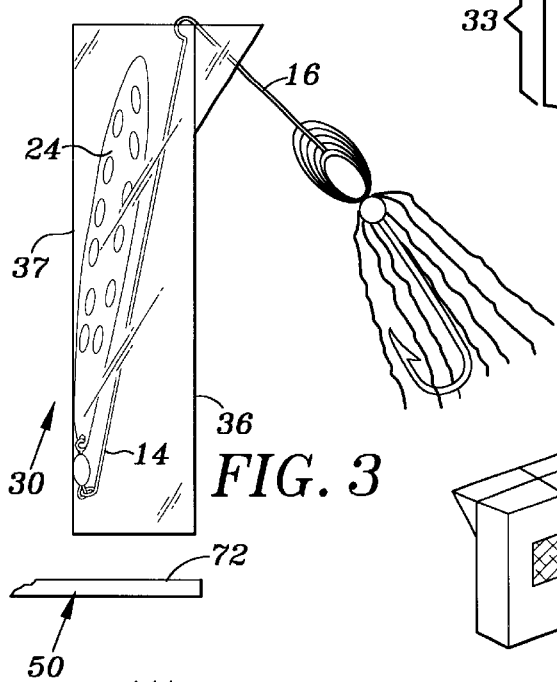
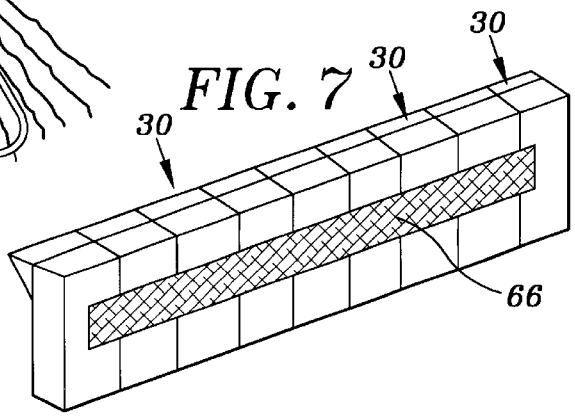
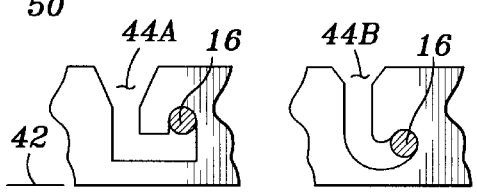
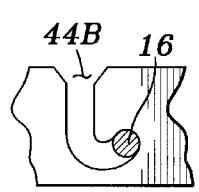
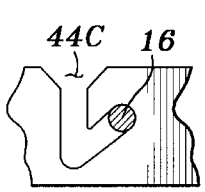
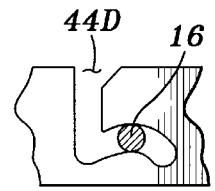

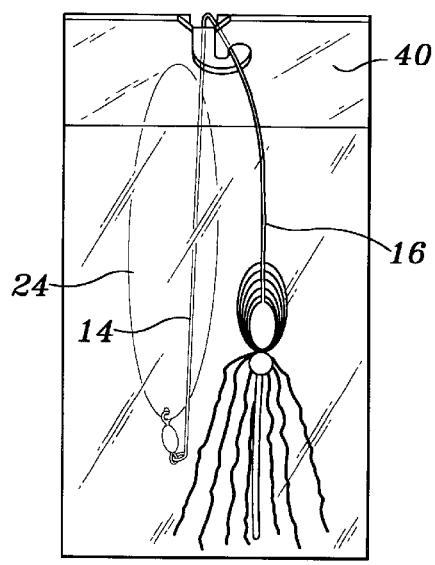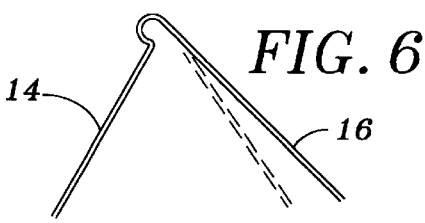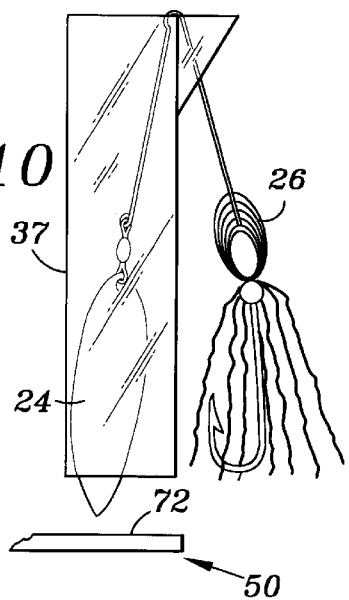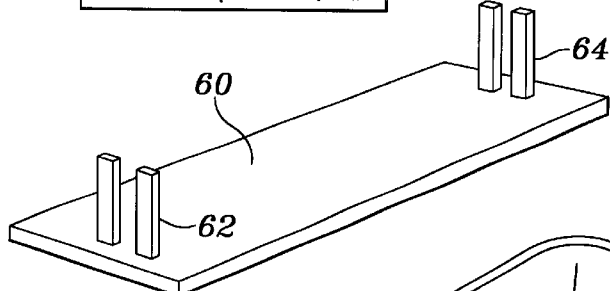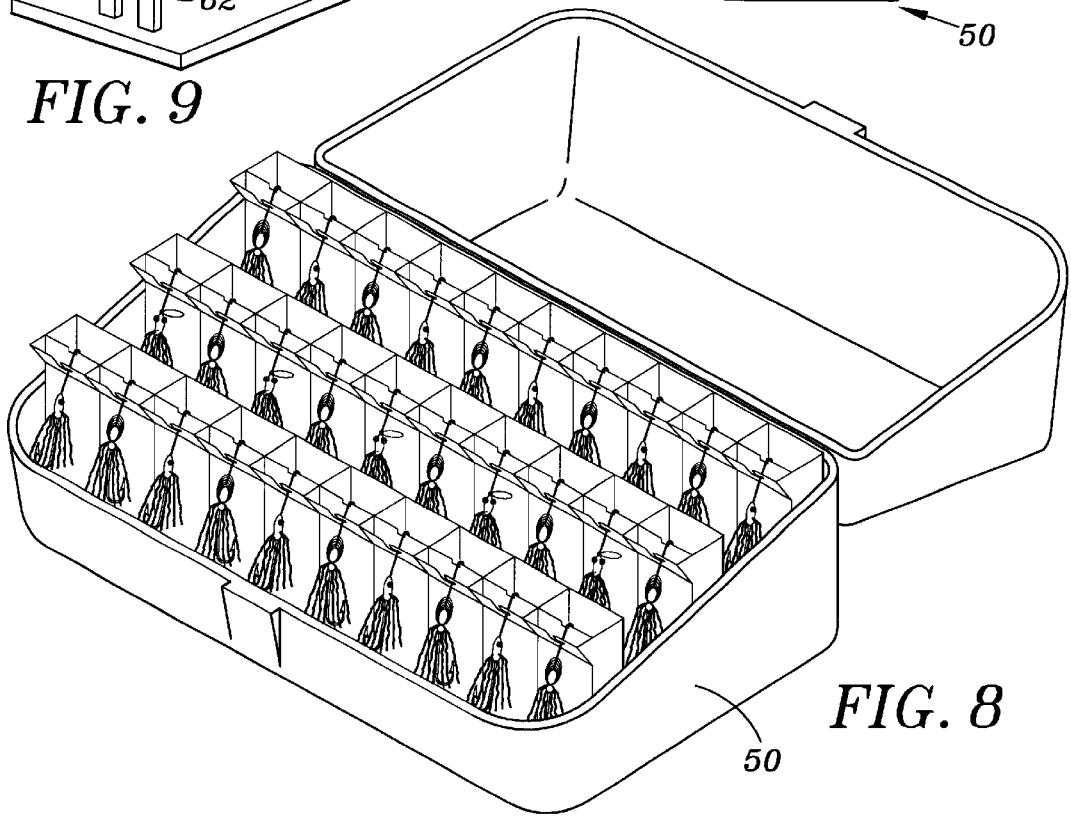

STORAGE DEVICE FOR FISH LURES, NAMELY, SPINNERBAITS

REFERENCE TO RELATED APPLICATION

This document contains subject matter that was disclosed by the present inventor in Provisional Patent Application Ser. No. 60/078,756 dated Mar. 15, 1998.

FIELD OF THE INVENTION

This invention relates generally to the storage of a particular variety of artificial fish baits (i.e., lures) wherein the lures have a relatively large planar element that depends from the lure. The depending element is generally called a blade or a "spoon," and said lures are commonly called spinnerbaits-because of the spinning action of the spoon-shaped blade as the lure is pulled through the water by a fisherman. More specifically, the invention relates to segregation of individual lures from one another when they are stored, so that a given lure can be selectively retrieved by a fisherman without the risk that the selected lure will be tangled with other lures.

BACKGROUND OF THE INVENTION

A popular form of artificial bait (i.e., a lure) for fishermen is a device that consists primarily of a piece of narrow wire, usually stiff piano wire having a diameter of about 0.040 inch and having a length of about five to eight inches. The wire is bent at a point near its middle to define a generally "V"-shaped member. When the "V"-shaped member is inverted, the two depending sections of wire have the appearance of two elongated legs, and they will be referred to herein as legs. The distal end of a fishing line is routinely connected to the apex of the V, so that the lure can be pulled through the water by a fisherman to simulate the movement of a minnow or a small fish that might be attractive to a large fish that is to be caught. At the distal end of one of the legs is a body or "head" and a downwardly extending hook whose presence is generally concealed by a plurality of narrow and flexible strips that, in toto, define a sort of depending skirt around the hook. At the lower end of the other leg is secured a plate or blade, usually having a slightly concave shape (as seen from the side) and often called a spoon because of the similarity in appearance to the shallow bowl of a teaspoon. As seen in a plan view, the plate may be said to usually have a generally elliptical shape, and it is often brightly painted or made of shiny metal.

A swivel connector is used to connect the forward end of the spoon to the second leg, so that the spoon will swivel or "spin" as the lure is pulled through the water. This spinning characteristic of a moving spoon justifies the name that is given to such lures, namely, spinnerbaits. An exemplary spinnerbait is shown in FIG. 3 of U.S. Pat. No. 4,999,943 to Crabtree entitled "Seat Pedestal Lure Container." A system for storing spinnerbaits using see-through packets or envelopes is disclosed in U.S. Pat. No. 4,927,016 to Fuller entitled "Spinner Bait Box And Storage System."

The wide angle between the two wire legs of a spinnerbait, which is often about 80 degrees, usually causes the lures to be somewhat awkward to handle when they are being put into and taken from a storage place. And if several loose spinnerbaits are hastily thrown into a pile in the bottom of an ordinary tackle box, they frequently become entangled with one another, such that it is often hard to pull one of them from a pile without also lifting one or two other ones at the same time. Therefore, it is an object of this invention to provide a storage device for spinnerbaits (or spinning lures) that will permit a single one to be selectively removed from a storage receptacle in a quick and easy manner—without disturbing others that are stored in adjacent receptacles.

Another object is to provide a holding system for spinnerbaits in which they are held in place by a force other than gravity, such that accidentally inverting a container will not result in spilling all of the contained spinnerbaits on the floor.

A further object is to provide a way of "bulk" loading of a plurality of spinnerbaits into a container for transportation to a favorite fishing hole, and the spinnerbaits having previously been categorized by color, size, blade type, etc.

These and other objects will be apparent from consideration of the following disclosure and reference to the drawing provided herewith.

BRIEF DESCRIPTION OF THE INVENTION

The invention comprises a combination for use by fishermen to foster the orderly storage and management of a certain kind of artificial lure, namely, spinnerbaits. To provide a frame of reference for use in defining the invention, it will no doubt be appropriate to clearly define the spinnerbaits that are to be stored by the invention. A typical spinnerbait has a principal structure consisting of a piece of spring wire that is bent, near its middle, into a generally V shape. The bending step creates first and second elongated legs that depend from an apex that is not excessively far from the middle of the spring wire. That is, the legs are usually of different lengths, because the bend is not in the center of the wire; but both legs have a significant length, i.e., in excess of one inch. The included angle between the two depending legs is usually about 80 degrees when the spinnerbait is at rest, i.e., when there is no tension in the wire. The two legs have distal ends that are remote from the apex of the spring wire, and there is a blade attached to the distal end of the first one of the legs. A body, also sometimes known as a head, is attached to the distal end of the other leg.

The spring wire usually has a diameter on the order of 0.040 inch and it has sufficient resilience to cause the spinnerbait to repeatedly return to its rest configuration after the two legs have been temporarily forced toward one another by a manual force. The bend in the wire may be a smooth bend, or, more commonly, there is a small loop or some irregularity that facilitates the attachment of a leader that can be connected—with a swivel—to the distal end of a fishing line.

A major feature of the invention is an open-top receptacle for receiving and holding the blade of a spinnerbait. The preferred receptacle has a pair of rigid, confronting and spaced-apart walls that are designated (for identification purposes) as first and second walls. The spacing between the first and second walls is made less than the width of a spinnerbait blade, in order that a vertically oriented blade within a receptacle cannot rotate about a vertical axis within the receptacle. Additionally, the first wall has a small notch that is sized and located to receive and restrain one leg of the spring wire against movement in a side-to-side direction with respect to the receptacle.

Another major part of the invention may be broadly described as a means for holding a given spinnerbait against accidental removal from the particular receptacle in which it is being stored. The holding is accomplished by manually placing the spring wire in tension by temporarily forcing the distal ends of the two legs together in order that the included angle between the two legs is appreciably less than the original 80 degrees. There is also a structure for restraining the legs and holding them against their natural tendency to return to a rest condition, i.e., to spread the legs back to the position they had before they were slightly distended during insertion. The preferred structure includes a small plate that is inclined away from and affixed to the first wall, and the plate having a generally L-shaped recess into which a leg of the spinnerbait is inserted when the spinnerbait is to be stored. The structural plate and an appropriately shaped and sized recess do their holding in a completely passive manner, in the sense that they have no moving parts or springs, etc. Instead of using moving parts, holding of a spinnerbait is accomplished in this invention by relying—at least primarily—on the resilience that is inherent in the wire of a spinnerbait. Observing this rule avoids the need for a separate spring that must be present and remain functional until such time as a spinnerbait is to be manually removed from a holding device. Expressed in other words, this invention does not have the limitation of requiring an "external" biasing spring—as shown in U.S. Pat. No. 4,604,822 to Christenberry entitled "Fishing Lure Holder."

Another way of evaluating the invention's holding function with regard to a given spinnerbait is to recognize that it mostly takes place near the apex of the spinnerbait wire. That is, an observer would not normally say that any holding action involves grasping or supporting either one of the spinnerbait's distal ends. Because of where a given spinnerbait is held (i.e., adjacent its middle rather than its two ends), it does not matter whether the legs of a spinnerbait would be reasonably characterized by an observer as long or short or medium. An analogy to the holding system disclosed herein would be to say that a hypothetical ladder is going to be supported on a truck entirely by balancing it at its middle. Because the ladder is not going to be supported at its ends, it will not matter whether the ladder is long or short, as long as there is space to accommodate the entire length of the ladder.

Another advantage of the preferred embodiment of the invention is that the bottom of the receptacle is completely open, such that part of a very long blade can pass all the way through the receptacle and out of the bottom thereof.

BRIEF DESCRIPTION OF THE SEVERAL FIGURES OF THE DRAWING

FIG. 1 is a perspective view of an exemplary spinnerbait that is commercial available on a wide scale in the United States and other countries.

FIG. 2 is a perspective view of a receptacle of the kind that is employed herein, with a single receptacle being shown to better illustrate certain parameters.

FIG. 3 is a side elevational view of a receptacle as shown in FIG. 2.

FIGS. 4A, 4B, 4C, and 4D show exemplary configurations for grooves for holding the body/hook leg of a spinnerbait when the spinnerbait has been installed in a receptacle.

FIG. 5 is a front elevation view of an installed spinnerbait in a transparent receptacle.

FIG. 6 is a sketch of two exemplary positions of a spinnerbait's wire, with one position indicating the spinnerbait at rest, and the other indicating its appearance when the two legs have been slightly bent toward one another.

FIG. 7 is a perspective view of a set of receptacles that are rigidly connected together to form a linear array of joined receptacles.

FIG. 8 is a perspective view of a container that is sized and shaped to hold three linear arrays of receptacles, with said arrays being arranged with a parallel configuration but with differing heights within the container.

FIG. 9 is a free-standing holder for an array of receptacles that have been removed from a container and need to be supported in a stable manner, and FIG. 10 is a side elevational view of a receptacle that does not have a closed bottom, with the result that a long spinnerbait blade can protrude out of the bottom of a receptacle suspended within a container.

DETAILED DESCRIPTION OF A PREFERRED EMBODIMENT OF THE INVENTION

To set the stage for a full description of the invention, it will probably be instructive to review the details of a typical spinnerbait, hereinafter identified by the reference numeral 10. A typical spinnerbait 10 has a principal structure consisting of a piece of spring wire 12 that is bent, near its middle, into a generally V shape. The bending step creates first and second elongated legs, 14, 16 that depend from an apex 18 that is not excessively far from the middle of the spring wire. That is, the legs 14, 16 are usually of different lengths, because the bend is not in the center of the wire; but both legs have a significant length, i.e., in excess of one inch. The included angle $\underline{A}$ between the two depending legs 14, 16 is usually about 80 degrees when the spinnerbait is at rest, i.e., when there is no tension in the wire. The two legs 14, 16 have distal ends 20, 22 that are remote from the apex 18 of the spring wire, and there is a blade 24 attached to the distal end of the first one of the legs 14. A body 26, also sometimes known as a head, is attached to the distal end of the other leg 16.

The spring wire 12 usually has a diameter on the order of 0.040 inch and it has sufficient resilience to cause the spinnerbait to repeatedly return to its rest configuration after the two legs have been temporarily forced toward one another by a manual force—to temporarily create an angle of less than $\underline{A}$. The bend in the wire may be a smooth bend, or, more commonly, there is a small loop 28 or some equivalent irregularity that facilitates the attachment of a leader that can be connected—with a swivel—to the distal end of a fishing line.

Referring next to FIG. 2, there is shown a single element of the invention, namely, a receptacle 30 that is adapted to receive and hold a single spinnerbait. Normally there will be a plurality of such elements 30 in a practical embodiment of the invention; but it is believed that it will simplify an understanding of the invention if a single element is first examined. The relatively tall and narrow receptacle 30 is aptly described as being vertically oriented; as such, it may be said to have an upper portion 32 with an open top 34, and a lower portion 36 with a bottom 38. The size of the open top 34 is large enough to loosely receive the blade part of a given lure; the blade is oriented to be generally vertical so that it may be inserted into the compartment by operation of gravity (as the lure is lowered by a fisherman over the receptacle). However, if the blade 24 is longer than the receptacle is tall, or if the leg to which the blade is attached is relatively long, it may be advantageous to fold the blade backward so that it rests alongside its supporting leg 14 before the blade is lowered into the receptacle-as shown in FIG. 3. The receptacle 30 may also be described as having a front wall 36 and a rear wall 38; the walls are preferably spaced about ½ inch apart, which is less than the typical width of a spinnerbait blade. When examined from the top, the receptacle 30 can be aptly described as having a rectangular cross section.

The apex of the wire 12 will normally remain just above the receptacle 30, because the spinnerbait's other leg (i.e., its "hook" leg 16) cannot be forced into the receptacle, along with the blade, when the receptacle is as narrow as is normally desired. In fact, the leg 16 (with the body and hook) will normally rest so that it extends outwardly from the receptacle's front wall 36 at an angle of about 75 to 80 degrees. It is held in this position by engagement with a generally L-shaped groove in a structural plate 40 that extends outwardly from the front wall 36. The groove has what will be called a generally vertical portion (namely, the upright part of an D, and a second portion (which could be called the "foot" or horizontal portion of an D). The exact shape of the groove is not critical, but it does need to have one physical characteristic. Assuming that there is a reference plane 42 that passes through the bottom of plate 40, at least some portion of the groove's second (horizontal) portion needs to be higher—with respect to the reference plane—than the entrance to the second portion. When this requirement is satisfied, a leg 16 can be flexed inwardly by a small amount and easily engaged with the upper portion of the L groove. Pushing the leg downwardly along the L will cause it to reach the groove's lower portion, where the leg can then be moved sidewardly (along the "foot" and away from the vertical portion of the groove) until it comes to rest in the elevated portion of the second part of the groove. When released, the natural resilience in the leg will cause it to try to return to its rest configuration, and the leg will be captured within the groove-until some person again deforms the leg just enough to permit it to be pulled back to the vertical portion of the groove.

Examples of grooves in plate 40 that would be operative to hold a leg 16 in a "captured" condition are shown in FIGS. 4A, 4B, 4C and 4D. To better show the position where a leg 16 would be held in a respective groove 44A, 44B, 44C, and 44D, the sizes of the spinnerbait's legs have been exaggerated in these four figures. It will be seen therefore that the notch 46 in front wall 36 (that holds the wire 12 against sideward movement) and the structural plate 40 (with one or another of the exemplary grooves) function as a means for holding a spinnerbait against accidental removal from a receptacle after it has been installed. And while it is preferred that a leg 16 be held in slight tension after a spinnerbait is installed, it would not matter too much if an installed leg returned to its full "rest" condition after it is installed. This is conditional, of course, on the requirement that removal of a spinnerbait from a holder would again require that a spring wire 12 be inwardly flexed before it could pass through and out of a groove.

To better show the relationship between the leg 16 at rest, and a typical position when the spinnerbait has been installed in a receptacle 30 (as shown in FIG. 5), there is shown a sketch (FIG. 6) that represents the positions of the leg 16 in two exemplary conditions.

Turning next to FIG. 7, an exemplary set of receptacles 30 are shown, with a given set being formed by rigidly connecting to a first receptacle a similarly shaped second receptacle, etc. Depending on the quantity of side-by-side receptacles that are rigidly connected together, the combination can receive and hold a desired number of spinner baits. With receptacles that are slightly more than 1 inch wide, ten such receptacles will be about 14 inches wide, and this is a preferred width for a plurality of receptacles. However, the ability to carry only ten spinnerbaits on a fishing trip would likely be considered inadequate by most serious fishermen. Hence, it is preferred that there be a box-like, portable container 50 (like a tackle box) that is sized to receive and hold multiple sets of receptacles 30. FIG. 8 shows a preferred container 50 that can receive and hold three sets of receptacles in parallel position. Also apparent from this view will be the preferred manner of holding a plurality of receptacles, i.e., with a first row of receptacles (in the front) being held in a relatively low position, a middle set being higher than the first row, and a back array of receptacles being the highest. When a fisherman stands in front of the three arrays (in a container), and a rotatable cover is opened, he will be better able to see all of the spinnerbaits by virtue of their different elevations. Visibility of a plurality of spinnerbaits is also improved by making the walls of each receptacle out of a transparent plastic material. When the walls of the receptacle 30 and the structural plate 40 are about ⅛ inch thick, it will generally be possible for a fisherman to readily see the sizes of the contained spinnerbaits as well as the colors of their bodies and blades, etc.

Another feature about the preferred embodiment of the invention is that the several arrays of receptacles can be individually and selectively removable from a box-like container 50. Assuming for example that a fisherman owns 60 spinnerbaits of various weights, sizes and colors, but he only owns one container 50, it will be possible to choose which ones of several arrays he wishes to place in the container and take with him on a given fishing trip. To facilitate long-term storage of an array of receptacles when they are not in a container 50, a free-standing holder 60 (FIG. 9) may be placed on a table or shelf. Naturally the space between the upright end members 62, 64 is equal to the spacing between the side walls of a container 50, so that a set of interconnected receptacles can be easily slipped down into the holder 60. But if several of the receptacles are fixed together in some arrangement other than a straight line, the shape of a complementary structural support will naturally be altered to accommodate the different arrangement. Or, a hook-and-loop fastener (e.g., VELCRO™) may be used to support receptacles away from a container 50, with one half of the fastener strip 66 being permanently placed on the back of a set of side-by-side receptacles, and the complementary half of the fastener being placed on a static structure that is remote from the container. For example, a vertical wall in a garage or storeroom may be used to mount several appropriate parts of hook-and-loop fasteners, to store those receptacles that are not being held in the container. One part of an exemplary hook-and-loop fastener 66 is shown attached to the backs of the receptacles in FIG. 7.

Another advantage of the construction disclosed herein is the ability to easily hold a grouping of spinnerbaits for cleaning, so that several spinnerbaits can be rinsed—at one time—after a fishing trip. This is accomplished by providing a drain hole 70 adjacent the bottom of each receptacle (as shown in FIG. 2). Alternatively, the entire bottoms of an array of receptacles can be omitted, so that there is nothing to capture debris when a stream of rinse water is directed downwardly at the spinnerbaits in any given array of receptacles. This sans-bottom construction has another benefit in that a spinnerbait with a very long blade can be stored by simply letting the blade extend below the receptacle, provided there is a spatial clearance between the container floor 72 and the bottoms of the adjacent receptacles. This embodiment is shown in FIG. 10, which is an elevational view of a receptacle with an "open" bottom—through which a long blade can extend.

While only the preferred features of the invention have been disclosed herein in great detail, it should be apparent to those skilled in the art that variations and minor changes can be made without departing from the general concepts disclosed herein. Hence, the scope of the invention should be measured only by the scope of the claims appended hereto.

What is claimed is:

1. A combination for use by fishermen to foster the orderly storage and management of artificial lures, comprising:

a) a spinnerbait having a principal structure consisting of a piece of spring wire that is bent into a generally V shape so as to define first and second elongated legs depending from an apex near the middle of the spring wire, and the included angle between the two depending legs being about 80 degrees when the spinnerbait is at rest, and the two legs having distal ends that are remote from the apex of the spring wire, and there being a blade attached to the distal end of one of the legs, and there being a body and hook attached to the distal end of the other leg, and the spring wire having sufficient resilience to cause the spinnerbait to repeatedly return to its rest configuration after the two legs have been temporarily forced toward one another by a manual force, comprising:

b) an open-top receptacle for receiving and holding the blade of a spinner-bait, and the receptacle having a pair of rigid, confronting and spaced-apart walls that are designated as first and second walls, and the spacing between the first and second walls being less than the width of the blade of a spinnerbait, such that a vertically oriented blade within a receptacle cannot rotate about a vertical axis within the receptacle, and the first wall having a notch that is sized and located to receive and restrain one leg of the spring wire against side-to-side movement with respect to the receptacle; and c) means for holding a spinnerbait against accidental removal from the receptacle, said holding being accomplished by manually placing the spring wire in tension by forcing the distal ends of the two legs together in order that the included angle between the two legs is appreciably less than 80 degrees, and including a structure for restraining the legs and holding them against their return to a rest condition until they have been manually removed from the receptacle, said restraining structure comprising a structural plate extending outwardly from the receptacle wall that has the notch therein, and said structural plate extending in a direction away from the second wall, and there being an L-shaped groove in the structural plate that has a first portion that is generally vertical and a second portion that is generally horizontal when the receptacle is being held upright, and the first portion of the groove opening to the top of the structural plate and being aligned with the slot in the first wall, and the L-shaped groove being sufficiently wide to freely receive that leg of the spinnerbait that has the body and hook thereon, and there being a reference plane that passes horizontally through the bottom of the receptacle when the receptacle is vertically oriented, and an interior portion of the groove's second portion having an elevation with respect to the reference plane that is higher than the entrance to the second portion, such that a leg of the spinnerbait can be manually forced downwardly into the first portion of the L-shaped groove and then moved sidewardly into the second portion, and the placement of the structural plate being located so that placement of a spinnerbait leg into the L-shaped groove requires slight temporary deformation of the spinnerbait wire, and such that the resilience of the spinnerbait wire will hold the spinnerbait in contact with the second portion of groove until such time as the spinnerbait wire is again manually deformed to permit disengagement from the groove.

2. A method for use by fishermen to foster the orderly storage and management of artificial lures, said lures being of the class that is commonly known as spinnerbaits, and each spinnerbait having a principal structure consisting of a piece of spring wire that is bent into a generally V shape so as to define first and second elongated legs that depend from an apex near the middle of the spring wire, and the included angle between the two depending legs being about 80 degrees when the spinnerbait is at rest, comprising the steps of:

a) providing a first structure against which a spinnerbait may rest, and said first structure having elements which will hold the depending legs at an angle that is less than the angle made by the two legs when they are at rest;

b) providing a second structure that will hold a spinnerbait against said first structure by virtue of preventing the depending legs from fully returning to a rest condition;

c) manually squeezing the two depending legs of a spinnerbait toward one another so that they form an angle that is significantly less than the angle they make when they are at rest; and d) placing the spinnerbait against the first structure while the two depending legs are squeezed toward one another, and subsequently allowing the spring wire to relax sufficiently so as to engage the second structure, such that the spinnerbait will be held against the first structure until the depending legs are again manually squeezed together in order to escape the holding action of the second structure, whereby the inherent resilience of the spring wire will help hold the spinnerbait against the first structure.

3. The method as claimed in claim 2 wherein the first structure constitutes a part of a tackle box having multiple receptacles, and wherein the spinnerbait has a blade that is more than ½ inch wide, and wherein the two legs of the spinnerbait are squeezed together in part by placing the blade in a given receptacle that is less than ½ inch wide, such that the spatial relationship between a spinnerbait blade and a receptacle will prevent the blade from turning in the receptacle, and such that a manual force may be readily applied to one of the spinnerbait's legs when its associated blade is being held in a given one of the receptacles.

4. The method of claim 2 wherein the second structure includes at least one notch, and wherein a first one of the spinnerbait's legs is manipulated so as to place it in alignment with the notch before the squeezed legs are allowed to relax to the extent that they more nearly approach their rest condition.

* * * * *